United States Patent [19]
Farmer

[11] 3,856,250
[45] Dec. 24, 1974

[54] INTERENGAGED COMPONENT ELECTRICAL EQUIPMENT MOUNT

[75] Inventor: Marion R. Farmer, Memphis, Tenn.

[73] Assignee: Aluma-Form, Inc., Memphis, Tenn.

[22] Filed: Oct. 24, 1972

[21] Appl. No.: 300,163

Related U.S. Application Data

[63] Continuation of Ser. No. 96,481, Dec. 9, 1970, abandoned.

[52] U.S. Cl. ............................... 248/221, 248/230
[51] Int. Cl. ............................................. F16m 13/02
[58] Field of Search ............ 248/221, 230, 65, 216, 248/226 R, 309, 314; 211/107; 24/243 AE, 243 C; 174/149, 148, 163, 45

[56] References Cited
UNITED STATES PATENTS

| | | | |
|---|---|---|---|
| 900,545 | 10/1908 | Humiston | 248/221 X |
| 2,114,876 | 4/1938 | Forbes | 248/221 |
| 2,333,519 | 11/1943 | Callander | 248/221 |
| 2,662,714 | 12/1953 | Jenne | 248/221 |
| 2,883,135 | 4/1959 | Smalley | 248/230 |
| 2,883,136 | 4/1959 | Smalley | 248/230 |
| 2,990,151 | 6/1961 | Phillips | 248/221 |
| 3,374,978 | 3/1968 | Salmon et al. | 248/221 |
| 3,497,171 | 2/1970 | Farmer et al. | 248/221 |
| 3,507,975 | 4/1970 | Scott | 248/221 X |
| 3,555,747 | 1/1971 | Taylor | 248/221 X |

*Primary Examiner*—J. Franklin Foss
*Attorney, Agent, or Firm*—Paul M. Denk

[57] ABSTRACT

In an electrical equipment mount for attachment to a utility pole, the numerous components included in the mount interengage with each other to provide enhanced structural support; an elongated bearing plate mounts either directly or through an adapter to the pole, while one or more channel members are embraced by said bearing plate to stabilize the same horizontally, with a series of vertically disposed brackets connecting and interlocking with the ends of said channel members and to a brace means extending forwardly from the central portion of said channel member(s) for providing the means for attachment of electrical devices.

15 Claims, 9 Drawing Figures

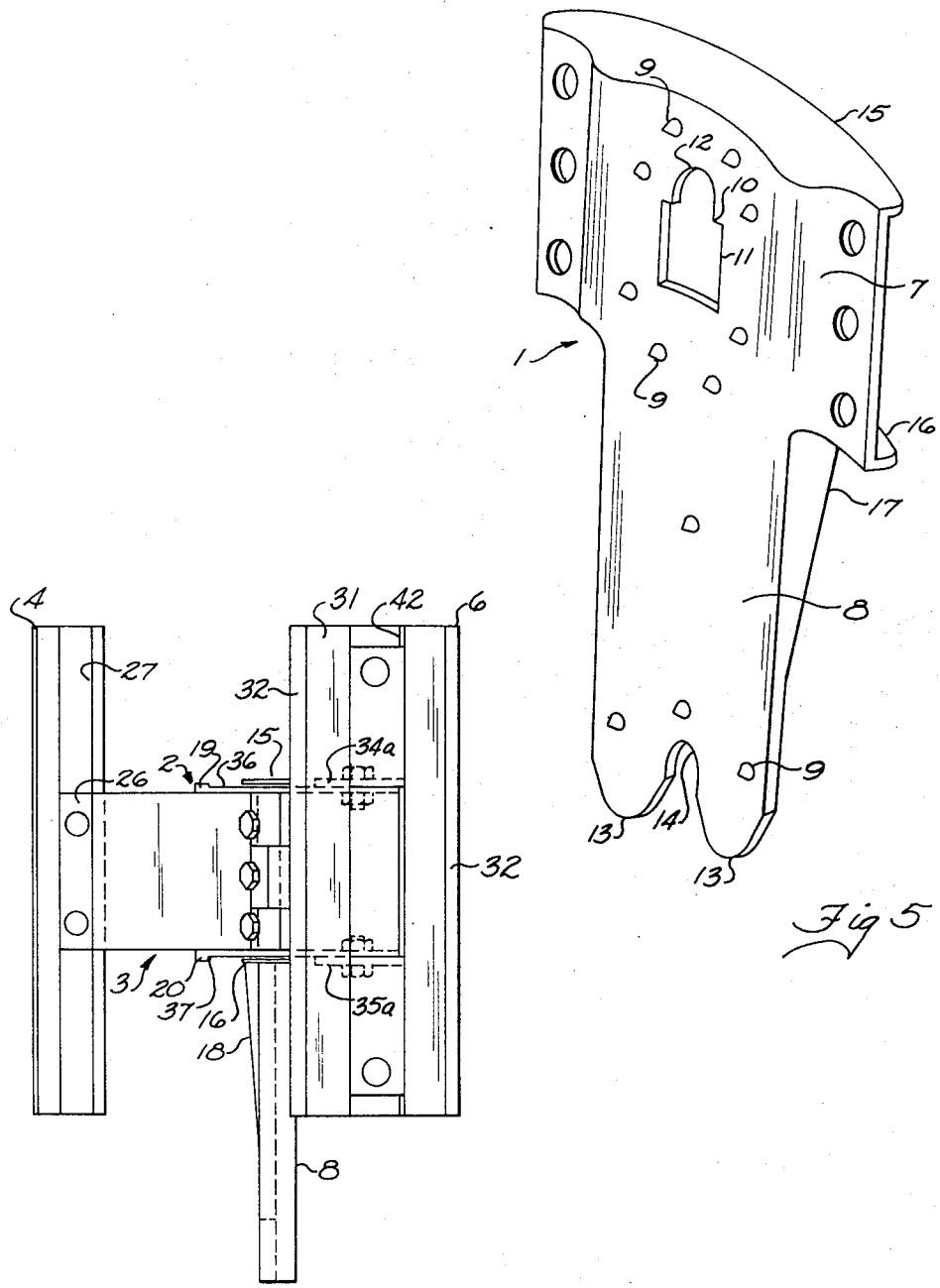

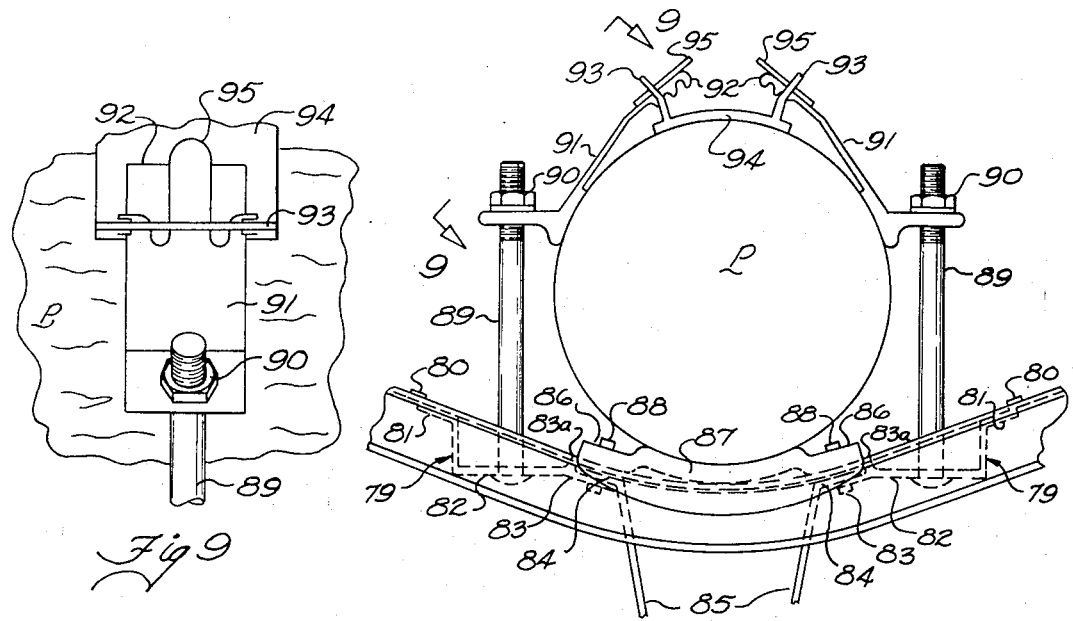
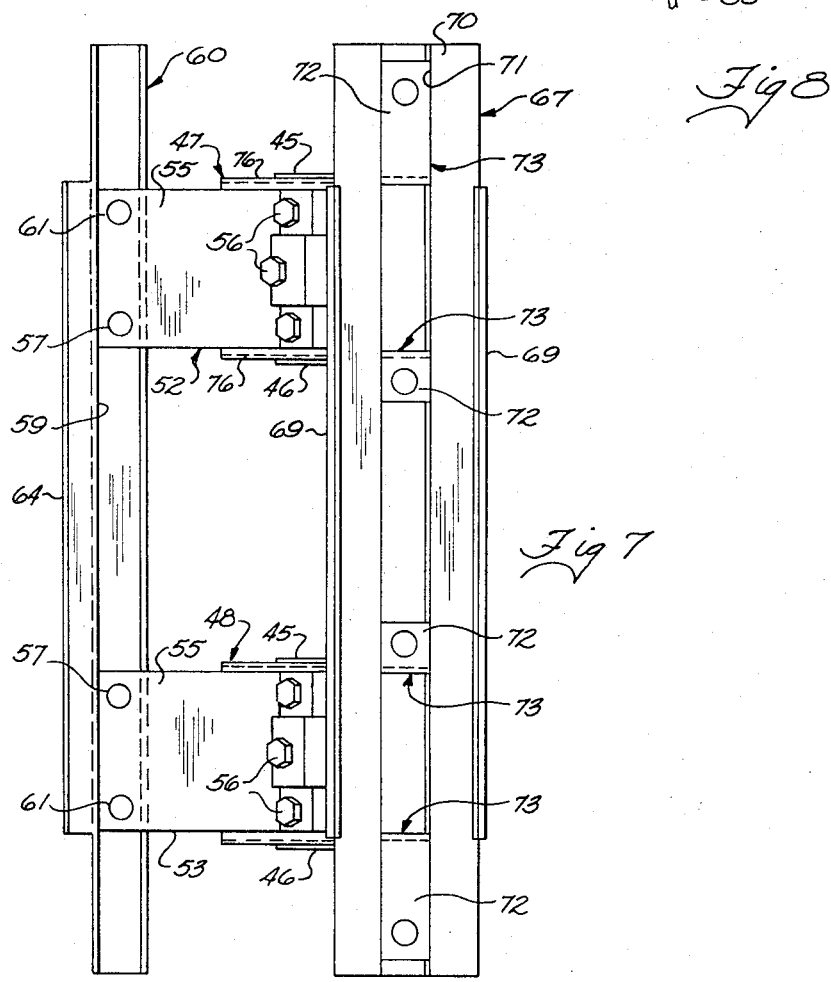

INTERENGAGED COMPONENT ELECTRICAL EQUIPMENT MOUNT

CROSS REFERENCE TO RELATED APPLICATION

The subject matter of this application is related to and comprises a continuation of the application of Marion R. Farmer, Ser. No. 96,481, filed on Dec. 9, 1970, now abandoned, and owned by a common assignee.

This invention relates generally to an electrical equipment mount, and specifically to a mount that is constructed of various components that interengage or interlock together to provide for enhanced, inherent structural support for heavy electrical devices supported upon a utility pole.

The current trend is to mount a plurality of electrical devices, such as a variety of transformers, in a cluster upon utility pole, since installation and maintenance of the series of mounted transformers can be accomplished efficiently in a minimum of time and effort, in addition to the reduced costs involved in utilizing one mounting device to support a series of devices where heretofore a singular mount was used to support each transformer. Inherent in the supporting of a series of electrical devices upon a sole utility pole is the increased weight involved, and therefore, the mount employed must be structurally sound and be of significant strength to support the increased load of a series of electrical devices, such as power and distribution transformers. For this reason, certain prior art mounting apparatuses have been devised to provide structural support for a series of, for example, transformers, and in the U.S. Pat. No. 2,879,964, issued to R. R. Anderson, one such apparatus is shown. It can immediately be seen that such a mounting apparatus must of necessity be constructed from heavy, press-molded metal plates, since there means of connection comprises solely a plurality of bolts that provide the full support for both attachment of the heavy transformers as shown, and securement of the apparatus to a utility pole. Although this prior art apparatus is probably effective for the mounting of electrical equipment, due to its size and weight it would appear to be rather difficult of handling by a utility man when attaching both the apparatus and the series of transformers upon a pole. To overcome this previous problem, some thought has been given to the reduction in the size and quantity of components utilized in providing support for electrical devices, and for example, the United States patent to D. M. Phillips, U.S. Pat. No. 2,990,151, discloses the use of a pair of channel members braced by elongated angle members and through the use of lugs support electrical devices thereto.

Recognizing that yet greater reduction can be made in the weight of transformer mounting devices, the U.S. patent to J. L. Salmon, U.S. Pat. No. 3,374,978, initially begins to recognize the advantages of interlocking lightweight aluminum components in a device for supporting electrical equipment upon a utility pole. Such a device facilitates the amount of effort that must be made by a utility man when mounting a series of transformers as shown. The present invention comprises yet a further improvement upon these prior art teachings in furnishing an electrical equipment mount that is totally formed from discrete components that may be interengaged or interlocked together to provide inherent structural support for heavy electrical devices, while yet being of greatly reduced weight.

It is therefore, the principle object of this invention to provide an electrical equipment mount being of increased strength for supporting heavy devices due to the interlocking of its component parts into a unitary fabrication.

It is another object of this invention to provide an electrical equipment mount which is of reduced weight so that it may be elevated and mounted upon a utility pole through a minimum of effort.

It is still another object of this invention to provide an equipment mount, while being light of weight, may yet support electrical equipment of significant weight.

It is a further object of this invention to provide an electrical equipment mount which incorporates optional means for its attachment to a utility pole.

It is yet a further object of this invention to provide an improved electrical equipment mount wherein various of its components are locked in place by means of design arranged flanges and grooves so that said components are prevented from distorting while supporting, for example, transformers upon a utility pole.

It is yet another object of this invention to provide and improved method of pre-fabricating electrical equipment to this mount so that field fabrication such as wiring is eliminated.

It is a further object of this invention to provide a mount that can be hoisted into position complete with all necessary electrical equipment wired and pre-fabricated before taken to the field.

It is a further object of this invention to provide a mount that is resistant to the forces of wind and the other elements so that its integral components cannot be twisted or distorted as a result of their interengagement with one another.

It is an additional object of this invention to to provide an electrical equipment mount wherein its various components may be quickly constructed as extruded members.

Other objects will become more apparent to those skilled in the art in the light of the following summary, description and accompanying drawings.

SUMMARY OF THE INVENTION

This invention is designed to provide an electrical equipment mount which may be assembled from various components, for example, discrete extruded components, that may be interlocked together to provide greater resistance against the various forces that are encountered by such a mount when supported upon a utility pole and holding rather heavy electrical devices, such as the various distribution and power transformers. More significantly, this electrical equipment mount in being formed from various interengaging components is also very effective in resisting almost all conceivable forces that may be exerted upon such a mount when in use and the only forces that this invention has not been designed to withstand, are those that for all practical purposes are seldom or never encountered by such an applied device.

This mount is formed having an elongated bearing plate which may be either mounted by bolts or other means of attachment to a utility pole, and it includes at least one or a pair of channel members that are stabilized horizontally upon the bearing plate by means of a series of protruding lips that embrace the upper and lower flanges of each channel. Thus, the normal downward shear or moment of force that may be exerted by a heavy transformer that is attached to either end of a channel member will be resisted against its turning of said channel member by means of this embracing relationship maintained by the bearing plate lips holding the flanges of said channel member. Obviously, when a pair of the channel members are used they may each be retained by a series of bearing plate lips protruding from either one or a pair of bearing plates so as to support transformers of greater height and weight.

Connecting to the web of each channel member and snugly confined by its flanges is a brace means that extends forwardly of each channel member, with said brace being stabilized against vertical movement by means of its securement intermediate said channel member flanges. The other ends of each leg of the brace means is formed having an integral boss shaped portion that is designed to mate within C-shaped flanges that extend rearwardly of the bracket designed to support electrical equipment. This bracket is formed having a vertically disposed plate, with said C-shaped flanges extending rearwardly therefrom, and with the front of each plate formed having a marginal rib along each edge that are designed to stabilize the mounting of an electrical device thereupon. A series of apertures provided in this bracket plate may accommodate fasteners that are usually carried by each transformer. It is to be noted that the mating engagement of the bossed ends of each brace within the C-shaped flanges of each bracket is a form of interengagement which further stabilizes the bracket, and the transformer mounted thereto, against untimely movement particularly when subjected to the forces of the elements such as winds of high velocity or the weight of snow.

The additional brackets that attach to either lateral ends of the channel member(s) are also formed to provide an interlocking fit with the proximate channel end. Each of said additional bracket is also formed having a vertically disposed plate, and a pair of flanges extend integrally from the surface of said plate that are spaced apart to that dimension which provides for its snug embracement upon the width of the end of the proximate channel member. Through this relationship, should any force be exerted upon the sides of the transformer, this interlocking relationship between the bracket and the channel end has a tendency to resist turning. For additional structural support, a pair of angles attach to the upper and lower flanges proximate each channel member end, being snugly inserted within grooves provided in the surface of each of said channel flanges, so as to provide an additional interlocking relationship, with the other leg of each angle projecting through a slot provided in the plate of the bracket, for snug retention within an additional groove provided continuous along the surface of said plate. Thus, the support for each additional bracket at a channel member end by means of this pair of slot seating angles further interlocks the connection of the bracket to the channel, and provides additional resistance against any movement of the mounted electrical equipment.

The entire electrical equipment mount may be secured to a utility pole by means of a series of bolts that may extend through the bearing plate to provide its retention to said pole, and a series of cleats project from the back side of the bearing plate for imbedment within the utility pole, as for example, when formed from wood, to stabilize the supporting of the mount upon said pole. As an alternative, and in those particular instances where local ordinances do not allow for the embedding of a bolt through a utility pole, an adapter including a pair of side frames are engaged within the web of each channel member just laterally of its brace means, and each side frame and adjacent channel web are provided with aligned aperatures through which a fastener may be extended in a direction towards the back side of the utility pole. A link is held by each fastener in proximity with the back side of the utility pole, and a single spacer engages the teeth of each link to complete the circumvention of the utility pole, and provide, as when each fastener is tightened, for full support of the mount upon said pole. All of this is accomplished without the use of any bolts or other fasteners that must be embedded in or disposed through the utility pole.

BRIEF DESCRIPTION OF THE DRAWINGS

In the drawings.

FIG. 4 is a side elevational view of the electrical equipment mount shown in FIG. 1;

FIG. 5 is a rear perspective view of the cleat laden bearing plate of the electrical equipment mount;

FIG. 7 is a side elevational view of the electrical equipment mount disclosed in FIG. 6;

FIG. 8 discloses a partial plan view of the adapter, being the optional fastener and link means for circumventing and securing the electrical equipment mount around a utility pole; and FIG. 9 is a fragmentary view of the retainer for securing a link to the spacer as shown along the line 9—9 of FIG. 8.

DESCRIPTION OF THE PREFERRED EMBODIMENT

Figure 1:
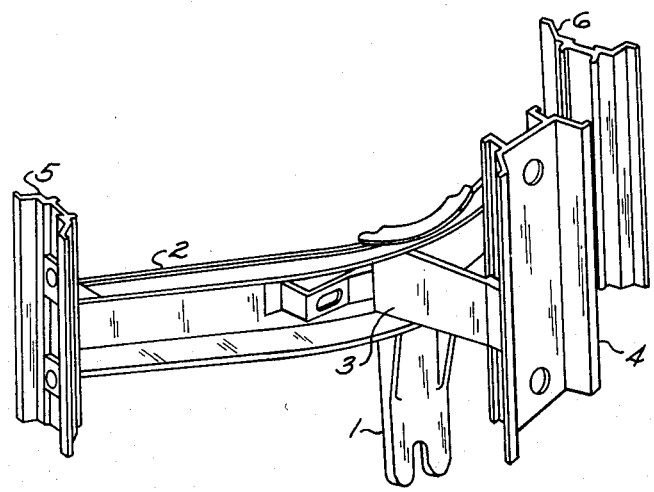
FIG. 1 is a perspective view of the electrical equipment mount of this invention formed having a single channel member.

Referring to the drawings for an illustration of one design of this invention, FIG. 1 discloses the electrical equipment mount A which comprises a rather elongated bearing plate 1 having a arcuate-like channel member 2 mounted thereto, with brace means 3 extending forwardly from said channel member to provide support for a front bracket or mounting pad 4. Also shown are a pair of additional brackets or mounting pads 5 and 6 which are attached to the lateral ends of said channel member, and each of these brackets 4, 5 and 6 are provided for supporting heavy electrical devices such as transformers or the like, as previously discussed.

By referring also to FIG. 5, a rear view of the bearing plate discloses that it is comprised as having a channel supporting portion 7 with a downwardly extending integral load supporting frame 8, and the backside of this bearing plate is formed having a series of projecting cleats, as at 9, so as to provide for fixation of the bearing plate against the utility pole, particularly one formed of timber. Through the upper portion of said bearing plate is an aperature 10 being expanded in its downward portion, as at 11, so that a bolt previously embedded within the utility pole may freely pass therethrough so that its shank may encounter its arcuate portion 12 to provide full support for said bearing plate upon the pole. Likewise, the downward portion of this bearing plate is constructed into a bifurcation, so as to form a pair of depending ears 13, with a slot 14 therebetween, to facilitate the use of an additional bolt or fastener to attach the bearing plate to the pole and enhance the structural support of this electrical equipment mount upon the same.

Figure 2:
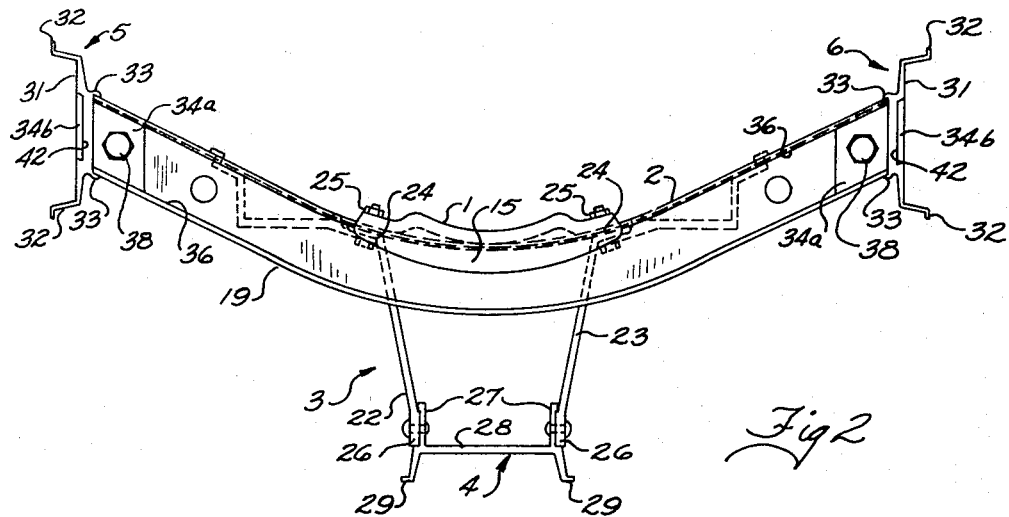
FIG. 2 is a plan view of the electrical equipment mount shown in FIG. 1.
Figure 3:
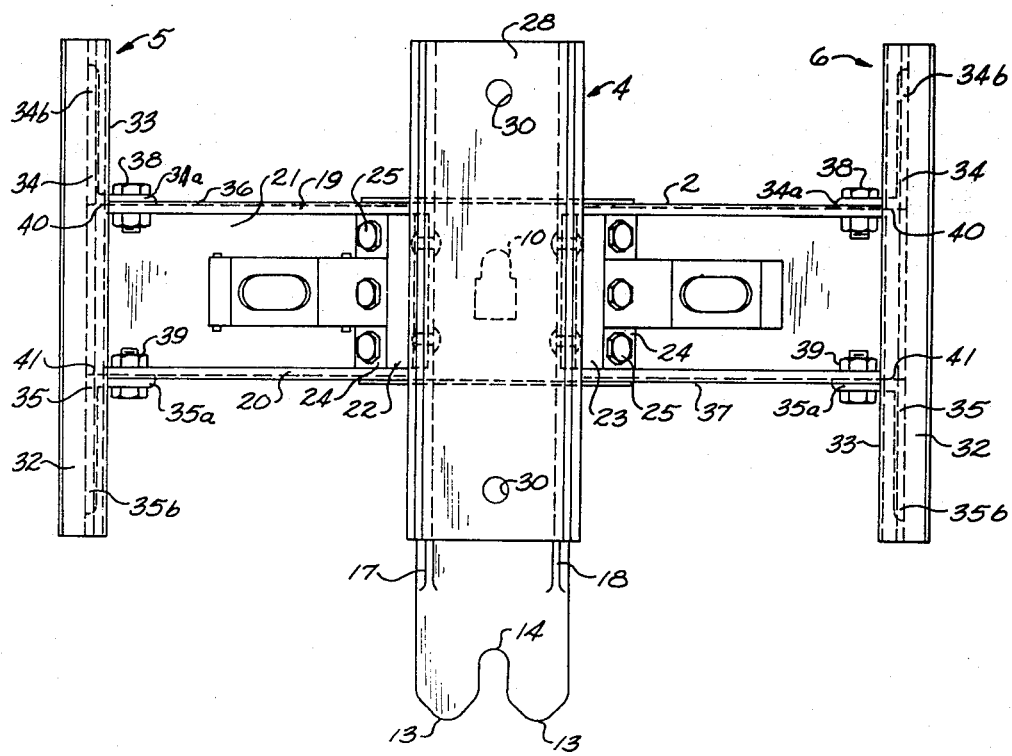
FIG. 3 is a front elevational view of the electrical equipment mount shown in FIG. 1.

By further referring to FIGS. 2 through 4, it can be seen that this bearing plate 1 is provided with a pair of upper and lower projecting lips 15 and 16, which respectively are spaced just that distance apart so as to provide for the snug insertion therebetween of the channel member 2. Obviously, the bearing plate, at the location at its lips, is designed as a curve so as to accommodate the similar curve of the contiguous channel member. As previously described, with the insertion of this channel member intermediate these two lips, a placement of a load at either end of the channel member, and the moment of force exerted thereby, will be resisted from turning the channel member by means of its snug engagement between these lips. Additionally, the front part of the lower portion 8 of the bearing plate is provided with a pair of integral vertical ridges 17 and 18 to further increase the structural strength of, particularly, the lower lip 16, and the entire bearing plate.

The channel member 2 is formed having a pair of upper and lower forwardly extending flanges 19 and 20 which are structurally held together as an integral unit by the usual channel web 21. Although this channel 2 may be formed from extruded lineal stock, it is herein shown to be of arcuate design so as to facilitate its handling upon the utility pole. Also it is likely that this channel member could be formed from box channel stock, with some slight modifications to be able to accommodate the other components of the mount.

The brace means 3 is formed having a pair of legs 22 and 23, each which is provided with a turned-out end as at 24, so that these ends of the legs may rest in close contact against the channel web and be secured by means of the fasteners 25 to both the channel 2 and the bearing plate 1. It is to be noted that the bearing plate proximate its lateral sides are bent forward to provide clearance for the fasteners 25 that insert through aligned aperatures in the brace legs, channel web, and said bearing plate. See FIG. 2. The legs 22 and 23 of the brace means have a height that provide for their snug retention intermediate the flanges 19 and 20 of channel member 2, so that said brace means will be resisted in moving downward, particularly when the bracket 4 supports a rather heavy load. See FIG. 3. These legs extend forwardly a sufficient distance to provide adequate clearance from the front of the channel member 2, and the forward part of each leg is provided with a shaped boss portion 26 which is designed for interlocking engagement with the rather C-shaped flanges 27 of said forward bracket 4.

This bracket 4 is designed having a substantially vertically disposed plate portion 28 which is integral with its side flanges 27, and from the frontal surface of said plate extend forwardly disposed ribs that are useful for stabilizing the retention of electrical devices to the bracket, such as lengthy cylindrically formed transformers. The bracket 4, and more particularly its plate 28, is provided with a series of aperatures, as at 30, therethrough, so as to accommodate any type of fastener that is used to retain an electrical device of this type upon the bracket.

Connecting to either end of the channel member 2 are the pair of additional brackets 5 and 6, which function similarly to the forward bracket 4, but for convenience of connection to the channel they are slightly different in design. Each bracket is formed having an irregular surface plate-like portion 31, which is formed having along its marginal edges a pair of projecting ribs 32 so as to accommodate and structurally support a load, with said plate having a pair of short flanges 33 extending from its opposite side and which are so designed having that degree of slant to provide for their close tolerance fitting with the contiguous canted end of the channel member 2. To further insure retention of these additional brackets to their respective ends of the channel member, a pair of angles 34 and 35, one extending upwardly from the channel flange 19, and one extending downwardly from the channel flange 20, interlock within the bracket to retain it fixed in place. This is achieved by the insertion of a leg 34a and 35a of the pair of angles within the slots 36 and 37 formed respectively within the channel flanges 19 and 20. The fasteners 38 and 39 secure the retention of the angles to the proximate ends of the channel member, and more particularly retain its legs within these slots 36 and 37. The other legs 34b and 35b of each angle snugly insert through the openings 40 and 41 provided through the plate 31 of the bracket, with these legs 34b and 35b also being inserted in close fitting within the vertically disposed slot 42 formed along the length of the plate 31. Thus, since the legs 34a and 35a of the angles are inserted within slots formed along the surface of the upper and lower flanges of channel 2, and the other legs 34b and 35b of said angles insert within a slot formed along the length of the bracket plate 31, it can be seen that this interjoining or interlocking relationship provides for rigid securement of the brackets 5 and 6 to their respective end of the channel member, in addition to any electrical devices that may be mounted upon said brackets. Obviously, to retain the brackets 5 and 6 snugly against the contiguous and normally canted channel 2, the legs 34a and 35a of these angles may be formed slightly turned so as to provide for convenient and aligned disposition within the channel slots 36 and 37, while maintaining the brackets 5 and 6 disposed facing substantially laterally of the mount.

Figure 6:
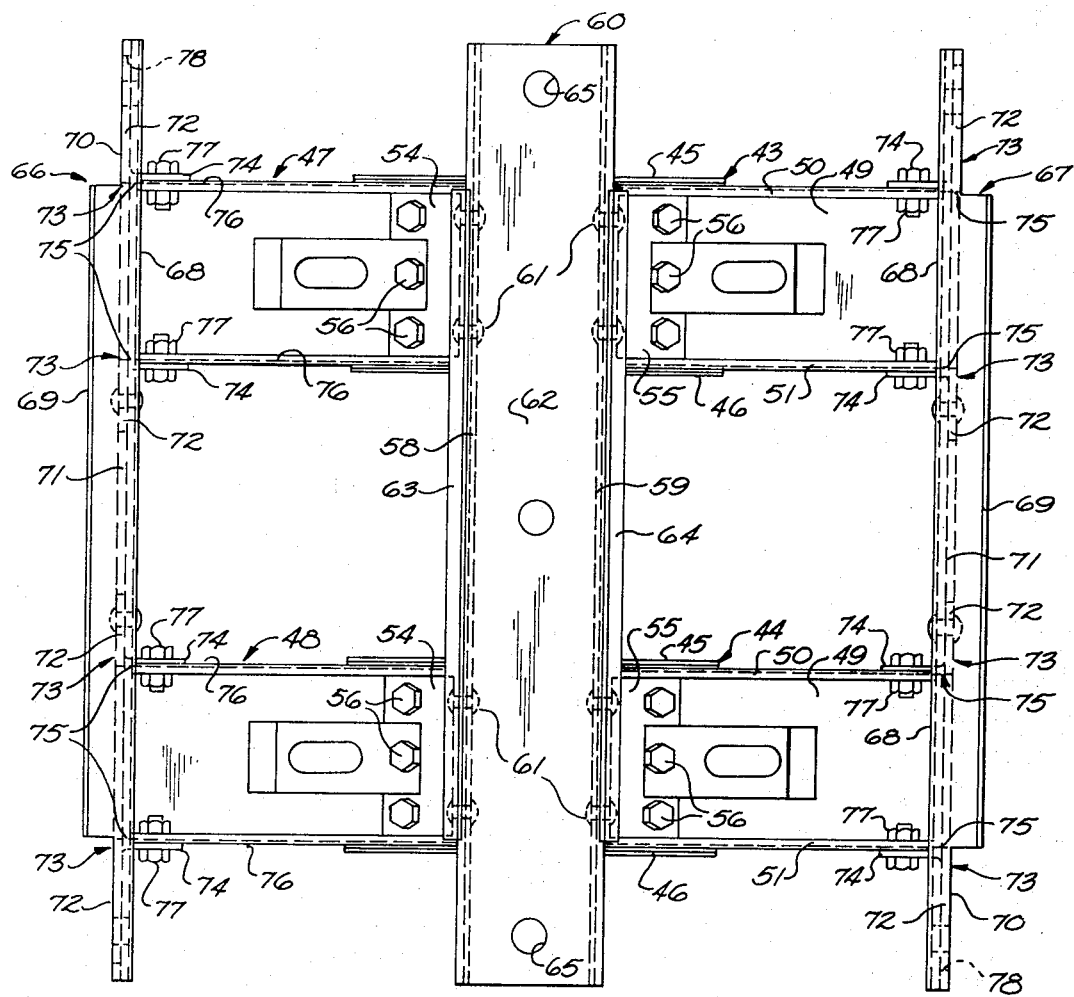
FIG. 6 provides a front elevational view of the electrical equipment mount emboding a pair of horizontally disposed, parallel arranged members.

In particular instances, the form of electrical device being mounted upon a utility pole may be of excessive size and weight, and for this reason, it might be necessary to provide supplemental support to hold the device stably in place. By referring to FIGS. 6 and 7, it can be seen that in place of a single channel member mounting upon a bearing to a utility pole, the invention is herein devised to employ a pair of shortened bearing plates 43 and 44, each having an upper and lower projecting lip, as at 45 and 46, respectively, which are useful for snugly embracing their mounted channels 47 and 48 therebetween. These channels are each designed having the usual web portions 49 with upper and lower flanges 50 and 51 extending forwardly therefrom. These channels may be of lineal design, or as shown in FIG. 2, be constructed also having an arcuate bend along their width.

Extending forwardly from their attachment to the web portions of each channel member are the braces 52 and 53, with each brace formed having independent legs 54 and 55 which are bent at the ends contiguous with the channel web, and being secured thereto by a series of fasteners, as at 56. Said brace legs extend forwardly and are provided with shaped boss or enlarged ends, as at 57, that snugly insert and interlock within the C-shaped flanges 58 and 59 that are integrally formed extending rearwardly from the forward bracket 60. Fastener means, such as the rivets 61, are provided for securing the legs 54 and 55 to the bracket 60. This bracket is formed having a plate-like portion 62, which has the flanges 58 and 59 secured thereto along its marginal edges, with forwardly extending ribs 63 and 64 which are useful in stabilizing the mounting of an electrical device against the bracket. A series of aperatures, as shown at 65, are provided for accommodating fasteners that hold an electrical device to the bracket.

Just as previously described, to each end of the channels 47 and 48 there are mounted an additional bracket 66 and 67, with each of these brackets having similar appearance, in cross section, as the previously described brackets 5 and 6 shown in FIGS. 1 and 2. The brackets are formed having rearwardly extending flanges, at at 68, which are designed to embrace the lateral ends of each of the channels, with each bracket having a pair of ribs 69 projecting in an opposite direction to provide structural support for any electrical devices mounted thereto. The plate like portion 70 of each bracket is formed having a longitudinal slot 71 formed along its length, which is useful for accommodating in close tolerance fitting the vertically extending legs 72 of each connecting angle 73 used in the association with the mounting of a bracket to each end of the channels 47 and 48, and each of said angles has a horizontally extending leg, as at 74, which extends through an opening 75 through the plate 70 for close tolerance retention within the slots 76 formed along the surface of the upper and lower flanges 50 and 51 to be snugly retained therein by means of the fasteners 77. Any type of standard means for fastening electrical devices to the brackets 66 and 67 may be used and the series of apertures 78 are provided for this purpose.

In those instances where local codes do not allow for the insertion of spikes into the utility pole, it may be desirable to use other means for fastening this electrical equipment mount to the utility pole. By referring to FIG. 8, an adapter including a pair of side frames 79, each having a multi-bent configuration, incorporate a small hooked portion 80 that inserts through a slot provided through the web of the adjoining channel. Each side frame is further bent inwardly, as at 81, to provide for its snug resting against the inner surface of the web, and once again is bent outwardly at approximately a perpendicular angle to provide a surface, as at 82, which is substantially parallel and planar with respect to the frontal portion of the utility pole. An additional tab 83 is provided on each side frame so as to be disposed in overlying relationship with the turned end 84 of the leg 85 of the forwardly extending brace, and with the lateral portion 86 of the underlying bearing plate 87. A single fastener 88 is disposed through all of these components to secure them together. In addition, a stem 83a inserts in an opening in the channel web to properly seat each side frame with respect to the channel members.

Extending rearwardly to either side of the utility pole, and projecting through the aligned apertures provided in the planar part 82 of the side frame and the channel web, are a pair of fasteners 89, herein shown being a pair of elongated bolts, which have snugly retained to it by means of the threaded nuts 90 the pair of links 91. Each link is formed having serrated end 92, which inserts through and engages the projecting flange 93 of a spacer 94. A resilient clip, as at 95, is provided for retaining the toothed engagement of the link ends 92 to their respective flanges of the spacer. Obviously, upon tightening of the nuts 90, the relationship between the spacer 94, the links 91, and the bearing plate 87 is such as to form a more confining relationship, thereby snugly tightening the electrical equipment mount to the utility pole P.

It is to be noted, in FIG. 2, that holes 96 are provided to receive any type of hoisting device that may assist in the lifting of the channel and the entire electrical equipment mount, in addition to any electrical devices, upon the utility pole during their installation.

Numerous variations in the construction of the electrical equipment mount of this invention, within a scope of the appended claims, may occur to those having skill in this particular art in light of this specification. The embodiments described herein are merely illustrative, and set forth by way of example the principles of this invention.

Having thus described the invention, what is claimed and desired to be secured by Letters Patent is:

1. An improved electrical equipment mount for attachment to a utility pole and formed from components that interengage to provide enhanced structural support comprising an elongated bearing plate adapted for bearing against said pole, means holding said bearing plate securely to the pole, a horizontally disposed channel member arranged for engagement at approximately its midpoint to said bearing plate, means provided upon said bearing plate for stabilizing said channel member in a horizontal position, brace means connecting at one end to said channel member and fixed against vertical movement by means of said member, a vertically disposed bracket connecting to and interlocking with the opposite end of said brace means, a pair of additional brackets, one of each bracket connecting to and interlocking with the laterally disposed end of said channel member, each additional bracket being formed having a vertically disposed plate, means associated with said plate to accommodate attachment of electrical devices to said bracket, a pair of flanges integrally connecting to and extending from the surface of said plate to embrace the contiguous end of the channel member to stabilize the mounting of said bracket, connecting means engaging both said plate and said proximate channel member to secure the same together, each connecting means comprising at least one angle means, each of said angle means formed having a pair of integrally attaching legs, said channel member formed having grooves provided upon its upper or lower surfaces, one leg of each angle means interlocking within a channel member groove to stabilize the bracket against movement, said angle means arranged through an aperture provided through said plate, said plate having a longitudinally disposed groove formed in its side opposite to the side of the plate that engages the channel member end, the other leg of said angle means interjoining within said plate groove to further stabilize the bracket, and fastener means securing said angle means to the respective plate and channel member to hold the same together.

2. An improved electrical equipment mount for attachment to a utility pole and formed from components that interengage to provide enhanced inherent structural support comprising, at least one bearing plate adapted for bearing against said pole, means holding said bearing plate to the pole, a pair of upper and lower horizontally disposed channel members arranged for engagement at approximately their midpoint to their bearing plate, means provided upon said bearing plate for stabilizing said channel members in a horizontal position, each channel member formed having a pair of flanges extending from an integral web, a brace means mounted to each channel member, each brace means having a height slightly less than the space between the flanges of the channel member to which it mounts to provide for its close tolerance fitting therebetween and connection to said channel member, a vertically disposed bracket connecting to and interjoining with each of the brace means, a pair of additional brackets, one of each additional brackets connecting between and interjoining with the laterally disposed vertically aligned ends of said upper and lower channel members, each bracket formed having a vertically disposed plate, means associated with each plate to accommodate attachment of electrical devices, ribs projecting integrally from one side of each plate to stabilize the mounting of electrical devices to each bracket, a pair of flanges integrally connecting to and extending from the other side of each plate to provide for interjoining of said bracket with the respective connecting brace means and lateral ends of the upper and lower channel members, there being a groove formed upon each channel member proximate each lateral end, at least one angle interconnecting within the groove of each channel member, each said angle being inserted through a slot provided through the plate of a proximate bracket, each plate having a groove formed therein, and said angle further interjoining within said plate groove to stabilize its bracket against movement, and fastener means securing each angle to its respective plate and channel member to secure the same together.

3. An improved electrical equipment mount for attachment to a utility pole and formed from components that interengage to provide enhanced structural support comprising an elongated bearing plate adapted for bearing against said pole, means holding said bearing plate securely to the pole, a horizontally disposed channel member arranged for engagement at approximately its midpoint to said bearing plate, means provided upon said bearing plate for stabilizing said channel member in a horizontal position, brace means connecting at one end to said channel member and fixed against vertical movement by means of said member, a vertically disposed bracket connecting to and interlocking with the opposite end of said brace means, a pair of additional brackets, one of each bracket connecting to and interlocking with the laterally disposed end of said channel member, said channel member being formed having a pair of flanges from its integral web, said brace means having a height slightly less than the space provided between said flanges to provide for its close tolerance fitting therebetween and stabilization of said brace means against vertical movement, said brace means formed having a pair of legs, each leg at one end being disposed snugly between said channel flanges for connection to said channel member, the opposite ends of said legs interlocking with the approximate sides of said vertically disposed bracket, said bracket being formed having a substantially vertically disposed plate, means associated with said plate to accommodate attachment of electrical devices, a rearwardly extending flange integrally connecting proximate each side edge of said plate, said flanges disposed for interlocking with a contiguous ends of said brace legs to stabilize the bracket against movement.

4. The invention of claim 3 wherein each rearwardly extending flange of the plate is integrally formed having a C-shape extending vertically of its length, the contiguous end of each brace leg formed having an integral boss shaped to mate within the C-shape of the proximate flange, and fastener means holding said boss within said shaped flange to stabilize the bracket against movement.

5. The invention of claim 3 wherein said vertically disposed bracket connecting to and interlocking with said brace means extends vertically upwardly and downwardly of said brace means.

6. An improved electrical equipment mount for attachment to the utility pole and formed from components that interengage to provide enhanced structural support comprising an elongated bearing plate adapted for bearing against said pole, means holding said bearing plate securely to the pole, a horizontally disposed channel member arranged for engagement at approximately its midpoint to said bearing plate, means provided upon said bearing plate for stabilizing said channel member in a horizontally disposed position, brace means connecting at one end to said channel member and fixed against vertical movement by means of said member, a vertically disposed bracket connecting to and interlocking with the opposite end of said brace means, a pair of additional brackets, one of each bracket connecting to and interlocking with a laterally disposed end of said channel member, said brackets disposed for mounting of electrical equipment, each additional bracket being formed having a vertically disposed plate that extends upwardly and downwardly of the channel member to which it attaches, means associated with said plate to accommodate attachment of electrical devices, a pair of flanges integrally connected to an extending from the surface of said plate to embrace the contiguous end of the channel member to stabilize the mounting of said bracket, and connecting means engaging both said plates and said proximate channel member to secure the same together.

7. The invention of claim 6 and further characterized by said plate having apertures provided therethrough to accommodate attachment of electrical devices, ribs integrally formed approximate each side edge of said plate and extending in a direction approximately opposite from said pair of flanges, said ribs provided for stabilizing the mounting of electrical devices to said bracket.

8. The invention of claim 3 and further characterized by said plate having apertures provided therethrough to facilitate securement of electrical devices to said bracket, and the means associated with said plate comprising a forwardly extending rib integrally formed proximate each side edge of said plate and provided for stabilizing the mounting of electrical devices to said bracket.

9. The invention of claim 3 wherein said means holding said plate to the pole includes a pair of side frames interjoining with said channel member laterally of said brace means, each side frame and the adjacent channel member having aligned apertures provided therethrough, a pair of fasteners, each fastener being arranged through the aligned apertures of each adjacent side frame and channel member, a pair of links, each link held by a fastener in proximity with the back side of the utility pole, and a spacer engaging each link whereby upon tightening of said fasteners the channel member and brackets are rigidly fixed with respect to said utility pole.

10. An improved electrical equipment mount for attachment to a utility pole and formed from components that interengage to provide enhanced inherent structural support comprising, at least one bearing plate adapted for bearing against said pole, means holding said bearing plate to the pole, a pair of upper and lower horizontally disposed channel members arranged for engagement at approximately their midpoint to their bearing plate, means provided upon said bearing plate for stabilizing said channel members in a horizontal position, each channel member formed having a pair of flanges extending from an integral web, a brace means mounting to each channel member, each brace means having a height slightly less than the space between the flanges of the channel member to which it mounts to provide for its close tolerance fitting therebetween and connection to said channel member, a vertically disposed bracket connecting to and interlocking with each of the brace means, a pair of additional brackets, one of each bracket connecting between and interjoining with the laterally disposed vertically aligned ends of said upper and lower channel members, said bracket and additional brackets each formed having a vertically disposed plate, means associated with each plate to accommodate attachment of electrical devices, ribs projecting integrally from one side of each plate to stabilize the mounting of electrical devices to each bracket, a pair of flanges integrally connecting to and extending from the other side of each plate to provide for interlocking of said brackets with their respective connecting brace means and lateral ends of the upper and lower channel members, and at least one angle means interconnecting between the lateral end of each channel member and the associated additional bracket to secure the same together.

11. The invention of claim 10 wherein the means holding said bearing plate to the pole includes a pair of side frames for each channel member, each side frame interjoining with the web of a channel member laterally of the brace means, each side frame and the adjacent channel web having aligned apertures provided therethrough, a fastener for each side frame being arranged through the aligned apertures, a link for each fastener, each link being held by its fastener to the approximate backside of the utility pole, and a spacer engaging with the pair of links of each channel member and retained snugly against the backside of the utility pole whereby upon tightening of said fasteners the channel members and interjoining brackets are rigidly fixed with respect to said utility pole.

12. The invention of claim 10 wherein said bearing plate comprises a pair of said plates for bearing against said pole, and one of each horizontally disposed channel members being arranged for engagement at approximately its midpoint to one of said bearing plates.

13. An improved electrical equipment mount for attachment to a utility pole and formed from components that interengage to provide enhanced structural support comprising a horizontally disposed channel member arranged for engagement at approximately its midpoint to the utility pole, means for securing said channel member to said utility pole, brace means connecting at one end to said channel member and fixed against vertical movement by means of said member, a vertically disposed bracket connecting to and interlocking with the opposite end of said brace means, a pair of additional brackets, one of said bracket connecting to and interlocking with the laterally disposed end of said channel member, said channel member being formed having a pair of flanges extending from its integral web, said brace means having a height slightly less than the space provided between said flanges to provide for its close tolerance fitting therebetween and stabilization of said brace means against vertical movement, said brace means formed having a pair of legs, each leg at one end being disposed snugly between said channel flanges for connecting to said channel member, the opposite ends of said legs interlocking with the approximate sides of said vertically disposed bracket, said bracket being formed having a substantially vertically disposed plate, means associated with said plate to accommodate attachment of electrical devices, a rearwardly extending flange integrally connecting proximate each side edge of said plate, said flanges disposed for interlocking with the contiguous ends of said brace legs to stabilize the bracket against movement.

14. An improved electrical equipment mount for attachment to a utility pole and formed from components that interengage to provide enhanced structural support comprising a horizontally disposed channel member arranged for engagement at approximately its midpoint to said utility pole, means holding said channel member to the utility pole, brace means connecting at one end to said channel member and fixed against vertical movement by means of said member, a vertically disposed bracket connecting to and interlocking with the opposite end of said brace means, a pair of additional brackets, one of each bracket connecting to and interlocking with a laterally disposed end of said channel member, said brackets disposed for mounting of electrical equipment, each additional bracket being formed having a vertically disposed plate that extends upwardly and downwardly of the channel member to which it attaches, means associated with said plate to accommodate attachment of electrical devices, a pair of flanges integrally connecting to and extending from the surface of said plate to embrace the contiguous end of the channel member to stabilize the mounting of said bracket, and connecting means engaging both said plate and said proximate channel member to secure the same together.

15. An improved electrical equipment mount for attachment to a utility pole and formed from components that interengage to provide enhanced inherent structural support comprising, a pair of upper and lower horizontally disposed channel members arranged for engagement at approximately their midpoint to said utility pole, means securing said channel members to said utility pole, each channel member formed having a pair of flanges extending from an integral web, a brace means mounting to each channel member, each brace means having a height slightly less than the space between the flanges of the channel member to which it mounts to provide for its close tolerance fitting therebetween and connection to said channel member, a vertically disposed bracket connecting to and interlocking with each of the brace means, a pair of additional brackets, one of each bracket connecting between and interjoining with the laterally disposed vertically aligned ends of said upper and lower channel members, said bracket and additional brackets each formed having a vertically disposed plate, means associated with each plate to accommodate attachment of electrical devices, ribs projecting integrally from one side of each plate to stabilize the mounting of electrical devices to each bracket, a pair of flanges integrally connecting to an extending from the other side of each plate to provide for interlocking of said brackets with their respective connecting brace means and lateral ends of the upper and lower channel members, and at least one angle means interconnecting between the lateral end of each channel member and the associated additional bracket to secure the same together.

* * * * *